(12) United States Patent
Liu et al.

(10) Patent No.: US 11,216,955 B2
(45) Date of Patent: Jan. 4, 2022

(54) TARGET TRACKING METHODS AND APPARATUSES, ELECTRONIC DEVICES, AND STORAGE MEDIA

(71) Applicant: BEIJING SENSETIME TECHNOLOGY DEVELOPMENT CO., LTD., Beijing (CN)

(72) Inventors: Shaohui Liu, Beijing (CN); Hongwei Qin, Beijing (CN)

(73) Assignee: BEIJING SENSETIME TECHNOLOGY DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 16/822,177

(22) Filed: Mar. 18, 2020

(65) Prior Publication Data

US 2020/0219268 A1    Jul. 9, 2020

Related U.S. Application Data

(63) Continuation of application No. PCT/CN2019/076354, filed on Feb. 27, 2019.

(30) Foreign Application Priority Data

Mar. 6, 2018    (CN) .................. 201810182797.X

(51) Int. Cl.
*G06K 9/00* (2006.01)
*G06T 7/246* (2017.01)
*G06K 9/46* (2006.01)

(52) U.S. Cl.
CPC .......... *G06T 7/246* (2017.01); *G06K 9/00228* (2013.01); *G06K 9/00771* (2013.01); *G06K 9/4628* (2013.01)

(58) Field of Classification Search
CPC ............ G06K 9/6274; G06K 9/00771; G06K 9/3233; G06K 9/4628; G06K 9/00228;
(Continued)

(56) References Cited

U.S. PATENT DOCUMENTS

2011/0286631 A1* 11/2011 Wagner .................... G06K 9/32
382/103
2012/0093364 A1* 4/2012 Sato ........................ G06T 7/277
382/103
(Continued)

FOREIGN PATENT DOCUMENTS

CN    101169827 A    4/2008
CN    106326837 A    1/2017
(Continued)

OTHER PUBLICATIONS

International Search Report in the international application No. PCT/CN2019/076354, dated May 28, 2019, 2 pgs.
(Continued)

*Primary Examiner* — Syed Haider
(74) *Attorney, Agent, or Firm* — Cooper Legal Group, LLC

(57) ABSTRACT

Target tracking methods and apparatuses, electronic devices, and storage media are provided. The method includes: obtaining features of a plurality of reference images of a target image; determining a plurality of initial predicted positions of a tracking target in the target image based on the features of the plurality of reference images; and determining a final position of the tracking target in the target image based on the plurality of initial predicted positions.

16 Claims, 2 Drawing Sheets

(58) Field of Classification Search
CPC .............. G06K 9/00261; G06T 7/246; G06T 2207/10016; G06T 2207/20084; G06T 2207/20081
See application file for complete search history.

(56) References Cited

U.S. PATENT DOCUMENTS

| | | | |
|---|---|---|---|
| 2012/0120237 A1* | 5/2012 | Trepess | H04N 5/144 348/143 |
| 2013/0113941 A1 | 5/2013 | Yoneyama | |
| 2015/0221136 A1 | 8/2015 | Shaburova | |
| 2015/0369918 A1 | 12/2015 | Tacke | |
| 2016/0180197 A1* | 6/2016 | Kim | G01S 5/16 382/103 |
| 2017/0084045 A1 | 3/2017 | Hsu et al. | |
| 2019/0096069 A1 | 3/2019 | Qian et al. | |
| 2019/0197703 A1* | 6/2019 | Wang | G06T 7/74 |
| 2019/0205694 A1 | 7/2019 | Wang et al. | |
| 2020/0160099 A1* | 5/2020 | Chen | G06K 9/4642 |

FOREIGN PATENT DOCUMENTS

| | | |
|---|---|---|
| CN | 106529587 A | 3/2017 |
| CN | 106909909 A | 6/2017 |
| CN | 107169939 A | 9/2017 |
| CN | 108416799 A | 8/2018 |
| CN | 108460787 A | 8/2018 |
| JP | 2000113158 A | 4/2000 |
| JP | 2010145965 A | 7/2010 |
| JP | 2011060167 A | 3/2011 |
| JP | 2011-118782 A | 6/2011 |
| JP | 2012159958 A | 8/2012 |
| JP | 2013021726 A | 1/2013 |
| JP | 2014241505 A | 12/2014 |
| JP | 2016085487 A | 5/2016 |
| JP | 2017156886 A | 9/2017 |
| JP | 2018026108 A | 2/2018 |
| WO | 2013001940 A1 | 1/2013 |
| WO | 2017080399 A1 | 5/2017 |

OTHER PUBLICATIONS

International Search Report in the international application No. PCT/CN2019/076355, dated May 28, 2019, 2 pgs.

"High-Speed Tracking with Kernelized Correlation Filters"; Nov. 5, 2014; joao F. Henriques, Rui Caseiro, Pedro Martins and Jorge Batista; IEEE Transactions on Pattern Analysis and Machine Intelligence, reprinted from the Internet at: https://arxiv.org/pdf/1404.7584.pdf, 14 pgs.

"Learning to Track at 100 FPS with Deep Regression Networks"; Aug. 16, 2016; David Held, Sebastian Thrun and Silvio Savarese; In European Conference on Computer Vision, Springer, reprinted from the Internet at: https://davheld.github.io/GOTURN/GOTURN.pdf, 26 pgs.

"Mask R-CNN" Oct. 2017; Kaiming He, Georgia Gkioxari, Piotr Dollar and Ross Girchick; In The IEEE International Conference on Computer Vision (ICCV), reprinted from the Internet at: https://openaccess.thecvf.com/content_ICCV_2017/papers/He_Mask_R-CNN_ICCV_2017_paper.pdf, pp. 2961-2069.

"Object Tracking Benchmark"; Sep. 2015; Yi Wu, Jongwoo Lim and Ming-Hsuan Yang; IEEE Transactions on Pattern Analysis and Machine Intelligence, vol. 37, No. 9, reprinted from the Internet at: https://faculty.ucmerced.edu/mhyang/papers/pami15_tracking_benchmark.pdf, pp. 1834-1848.

First Office Action of the Chinese application No. 201810182797.X, dated Nov. 29, 2019, 12 pgs.

Second Office Action of the Chinese application No. 201810182797.X, dated May 28, 2020, 18 pgs.

First Office Action of the Chinese application No. 201810184967.8, dated Jul. 1, 2019, 14 pgs.

Second Office Action of the Chinese application No. 201810184967.8, dated Apr. 14, 2020, 16 pgs.

"FlowNet: Learning Optical Flow with Convolutional Networks", Dec. 2015, Alexey Dosovitskiy, Philipp Fischer, Eddy Ilg, Philip Hausser, Caner Hazirbas, Vladimir Golkov, Patrick Van De Smagt, Daniel Cremers and Thomas Brox, IEEE International Conference on Computer Vision, US, IEEE, pp. 2758-2766.

First Office Action of the Japanese application No. 2020-516424, dated May 20, 2021, 6 pgs.

First Office Action of the Japanese application No. 2020-516429, dated May 18, 2021, 13 pgs.

Second Office Action of the Japanese application No. 2020-516424, dated Sep. 3, 2021, 6 pgs.

First Office Action of the U.S. Appl. No. 16/819,487, dated Jul. 30, 2021, 17 pgs.

* cited by examiner

TARGET TRACKING METHODS AND APPARATUSES, ELECTRONIC DEVICES, AND STORAGE MEDIA

CROSS-REFERENCE TO RELATED APPLICATION

The present disclosure is a U.S. continuation application of International Application No. PCT/CN2019/076354, filed on Feb. 27, 2019, which claims priority to Chinese Patent Application No. CN201810182797.X, filed with the Chinese Patent Office on Mar. 6, 2018, and entitled "TARGET TRACKING METHODS AND APPARATUSES, ELECTRONIC DEVICES, PROGRAMS, AND STORAGE MEDIA". The disclosures of International Application No. PCT/CN2019/076354 and Chinese Patent Application No. CN201810182797.X are incorporated herein by reference in their entireties.

BACKGROUND

The target tracking issue generally refers to predicting, in condition that the position information of a target object in the first frame of a video sequence is given, subsequent positions of the object in the video. The target tracking technologies are widely used in application scenarios such as video surveillance, self-driving, and human-computer interaction. Since the detection technology and the segmentation technology of a single frame are relatively time-consuming, the target tracking technology is usually used together with the detection/segmentation technology to improve the information processing speed, thereby ensuring a better real-time performance.

SUMMARY

The present disclosure relates to computer vision technologies, and in particular, to target tracking methods and apparatuses, electronic devices, and storage media.

Embodiments of the present disclosure provide a target tracking technology.

According to one aspect of the embodiments of the present disclosure, a target tracking method is provided, including:
obtaining features of a plurality of reference images of a target image;
determining a plurality of initial predicted positions of a tracking target in the target image based on the features of the plurality of reference images; and
determining a final position of the tracking target in the target image based on the plurality of initial predicted positions.

According to another aspect of the embodiments of the present disclosure, a target tracking apparatus is provided, including:
a reference obtaining unit, configured to obtain features of a plurality of reference images of a target image;
an initial prediction unit, configured to determine a plurality of initial predicted positions of a tracking target in the target image based on the features of the plurality of reference images; and
a final position unit, configured to determine a final position of the tracking target in the target image based on the plurality of initial predicted positions.

According to another aspect of the embodiments of the present disclosure, an electronic device is provided, including a processor, where the processor includes the foregoing target tracking apparatus.

According to another aspect of the embodiments of the present disclosure, an electronic device is provided, including a memory configured to store executable instructions; and
a processor configured to communicate with the memory to execute the executable instructions so as to implement the foregoing target tracking method.

According to another aspect of the embodiments of the present disclosure, a computer storage medium is provided, configured to store computer-readable instructions, where when the instructions are executed by a processor, the processor implements the foregoing target tracking method.

According to another aspect of the embodiments of the present disclosure, a computer program is provided, including computer-readable codes, where when the computer-readable codes run in a device, a processor in the device executes the foregoing target tracking method.

According to yet another aspect of the embodiments of the present disclosure, a computer program product is provided for storing computer-readable instructions, where when the instructions are executed, the computer implements the target tracking method according to any one of the foregoing possible implementations.

In one optional embodiment, the computer program product is specifically a computer storage medium. In another optional embodiment, the computer program product is specifically a software product, such as SDK.

The embodiments of the present disclosure further provide another target tracking method and a corresponding apparatus, an electronic device, a computer storage medium, a computer program, and a computer program product. The method includes: obtaining features of a plurality of reference images of a target image; determining a plurality of initial predicted positions of a tracking target in the target image based on the features of the plurality of reference images; and determining a final position of the tracking target in the target image based on the plurality of initial predicted positions.

The following further describes in detail the technical solutions of the present disclosure with reference to the accompanying drawings and embodiments.

BRIEF DESCRIPTION OF THE ACCOMPANYING DRAWINGS

The accompanying drawings constituting a part of the specification describe the embodiments of the present disclosure and are intended to explain the principles of the present disclosure together with the descriptions.

According to the following detailed descriptions, the present disclosure may be understood more clearly with reference to the accompanying drawings.

DETAILED DESCRIPTION

Figure 1:
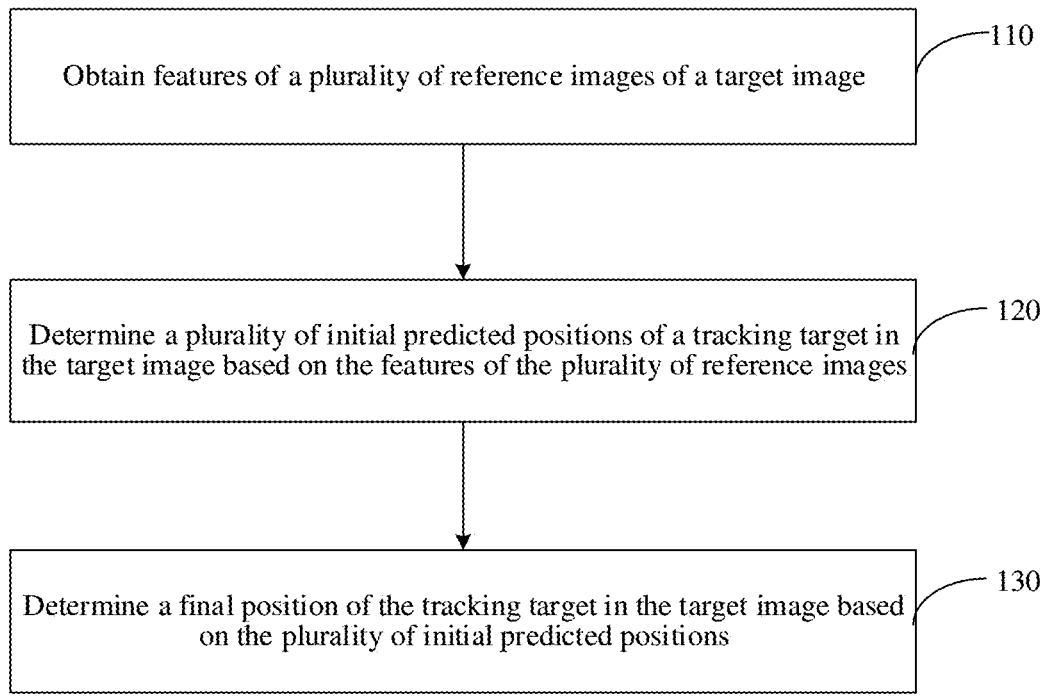
FIG. 1 is a flowchart of a target tracking method provided by the embodiments of the present disclosure.

According to the target tracking methods and apparatuses, electronic devices, and storage media provided by the embodiments of the present disclosure, features of a plurality of reference images of a target image are obtained, a plurality of initial predicted positions of a tracking target in the target image are determined based on the features of the plurality of reference images, and a final position of the tracking target in the target image is determined based on the plurality of initial predicted positions. Therefore, the dependence of target tracking on reference images can be avoided, thereby improving the robustness of target tracking.

Various exemplary embodiments of the present disclosure are now described in detail with reference to the accompanying drawings. It should be noted that, unless otherwise stated specifically, relative arrangement of the components and operations, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person skilled in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to a computer system/server, which may operate with numerous other general-purpose or special-purpose computing system environments or configurations. Examples of well-known computing systems, environments, and/or configurations suitable for use together with the computer system/server include, but are not limited to, Personal Computer (PC) systems, server computer systems, thin clients, thick clients, handheld or laptop devices, microprocessor-based systems, set top boxes, programmable consumer electronics, network PCs, small computer systems, large computer systems, distributed cloud computing environments that include any one of the foregoing systems, and the like.

The computer system/server may be described in the general context of computer system executable instructions (for example, program modules) executed by the computer system. Generally, the program modules may include routines, programs, target programs, components, logics, data structures, and the like for performing specific tasks or implementing specific abstract data types. Generally, the program modules may include routines, programs, target programs, components, logics, data structures, and the like for performing specific tasks or implementing specific abstract data types. In the distributed computing environments, the program modules may be located in local or remote computing system storage media including storage devices.

FIG. 1 is a flowchart of a target tracking method provided by the embodiments of the present disclosure. The method may be performed by any electronic device, such as a terminal device, a server, or a mobile device.

At operation 110, features of a plurality of reference images of a target image are obtained.

In an optional example, operation 110 may be performed by a processor by invoking a corresponding instruction stored in a memory, or may be performed by a reference obtaining unit 41.

In order to track a tracking target, a plurality of image frames of the tracking target is optionally acquired by means of video recording or the like, and by determining the positions of the tracking target in these images in combination with the time of obtaining the images, the trajectory of the tracking target by time is determined, thereby implementing tracking of the tracking target.

In some embodiments, in order to track a tracking target, the position of the tracking target in one or more known images is required, and the tracking target currently required to be tracked is determined based on the position; or, the known tracking target is a certain particular target (for example, a face or human body), and a plurality of image frames are acquired for the known tracking target.

Optionally, the tracking target is tracked based on the determined position of the tracking target in one or more images. The tracking target in the embodiments of the present disclosure may be a known or unknown particular object, a human being or an object of other types, which is not limited in the embodiments of the present disclosure.

In the embodiments of the present disclosure, a reference image list including a plurality of reference images is employed. Any two of the plurality of reference images may be adjacent or not be adjacent to each other. For example, the plurality of reference images are K adjacent image frames in a video stream; or some adjacent reference images in the plurality of reference images are adjacent to each other in the video stream, and the other adjacent reference images are not adjacent to each other in the video; or any two adjacent reference images in the plurality of reference images are not adjacent to each other in the video stream. Optionally, the plurality of reference images are spaced by one or more images. For example, adjacent reference images in the plurality of reference images may be spaced by a fixed number of image frames, such as N image frames, where N is a preset value greater than or equal to 2, the value of N may be determined according to application scenarios and requirements, and is not limited in the embodiments of the present disclosure; or, different adjacent images in the plurality of reference images are spaced by different numbers of images, which is not limited in the embodiments of the present disclosure.

It should be understood that, the term "adjacent images or adjacent reference images in a plurality of reference images" in the present disclosure may refer to adjacent reference images in the plurality of reference images sorted by a certain sorting rule, where the sorting rule may be sorting by the acquisition time, the detection time, etc., and the term "adjacent images in a video stream" in the present disclosure may refer to adjacent images in a plurality of images sorted in a video stream or a video stream clip, where the sorting may refer to the original order or a certain particular sorting rule in the video stream. The specific implementation of the sorting is not limited in the embodiments of the present disclosure.

In the embodiments of the present disclosure, the target image is optionally adjacent to the plurality of reference images thereof, or the target image and the reference images thereof are spaced by at least one image frame (which is called a second image). Optionally, the target image is spaced from any reference image in the plurality of reference images thereof by one or more images; or, the target image is adjacent to some reference images in the plurality of reference images, and is spaced from other reference images in the plurality of reference images by one or more images, which is not limited in the embodiments of the present disclosure. Compared to the manner of using the previous image frame of the target image as a reference image, the technical solution provided in the embodiments of the present disclosure can improve the prediction precision, which is resulted from the fact that the prediction based on an earlier image is more accurate, and the problem of error accumulation may be efficiently solved by using an earlier image as a reference image for tracking.

In the embodiments of the present disclosure, different images are optionally have different reference images, or the same reference image is reused for a plurality of images. For example, the target image and at least one third image may have the same reference image. For example, the plurality of reference images of the target image are identical to the plurality of reference images of the third image, or some reference images in the plurality of reference images of the target image are also reference images of the third image, which is not limited in the embodiments of the present disclosure. The at least one third image is optionally adjacent to the target image. However, the embodiments of the present disclosure are not limited thereto. In this case, the feature of a reference image is optionally stored to a buffer, and only the stored feature of the reference image needs to be invoked when predicting the position of a tracking target in an image so as to improve the position prediction speed.

In the embodiments of the present disclosure, the feature of a reference image may be obtained by various modes. In some embodiments, the feature of a reference images may be obtained from other apparatuses. For example, a server receives the feature of a reference image sent by a terminal device. For another example, an electronic device obtains the feature of a reference image from a database, where the database may be disposed in the electronic device locally or in other devices. In other embodiments, after a reference image is obtained, feature extraction may be performed on the reference image to obtain the feature thereof.

In one or more optional embodiments, features of a plurality of reference images stored by a memory of an electronic device may be obtained. For example, features of a plurality of reference images of a target image are obtained from a second buffer. Optionally, the features of the reference images may be stored in the second buffer, and obtained from the second buffer, where the second buffer may also be called a location exemplar buffer. However, the name of the second buffer is not limited in the embodiments of the present disclosure.

In the embodiments of the present disclosure, the second buffer may be used for storing information of a reference image, and optionally, the second buffer may store information of a plurality of images currently used as reference images, i.e., information of a plurality of reference images currently included in a reference image list. For example, the second buffer stores the feature of a reference image or further stores position information of a tracking object in the reference image, which is not limited in the embodiments of the present disclosure.

In a target tracking method implemented based on a deep recurrent network, the deep recurrent network consists of a reference image branch and a target image branch. The reference image branch may obtain valuable location exemplar information by using a reference image feature extractor to guide the target image branch to predict the position of a target object. Optionally, the strategy of using the $(t-1)^{th}$ frame to predict the $t^{th}$ frame is generally used. However, in fact, when predicting the position of the target object in the $t^{th}$ frame, all the images in front of a $(t-2)^{th}$ frame has passed through the feature extractor of the reference image branch, and an effective location exemplar has been obtained. Therefore, the location exemplar is reused, thereby improving the speed of the tracking system.

At operation 120, a plurality of initial predicted positions of a tracking target in the target image are determined based on the features of the plurality of reference images.

In an optional example, the operation 120 may be performed by a processor by invoking a corresponding instruction stored in a memory, or may be performed by an initial prediction unit 42.

In some embodiments, one initial predicted position of the tracking target in the target image may be obtained based on the feature of each of the plurality of reference images, and correspondingly, the plurality of initial predicted positions are in one-to-one correspondence with the plurality of reference images. In some other embodiments, one initial predicted position of the tracking target in the target image may be obtained based on the features of at least two of the plurality of reference images, and correspondingly, the number of the plurality of initial predicted positions are equal or unequal to the number of the plurality of reference images, which is not limited in the embodiments of the present disclosure.

In one or more optional embodiments, the operation 102 may include that:

feature extraction is performed on the target image to obtain a plurality of features of the target image; and the plurality of initial predicted positions of the tracking target in the target image are obtained based on the plurality of features of the target image and the features of the plurality of reference images.

The number of the plurality of features of the target image may be equal or unequal to the number of the plurality of reference images, and this is not limited in the embodiments of the present disclosure.

It should be understood that the term "feature" in the embodiments of the present disclosure may refer to a feature vector, a feature matrix, a feature tensor or a feature map, which is not limited in the embodiments of the present disclosure.

In some embodiments, the plurality of features of the target image and the features of the plurality of reference images may be subjected to weighted averaging or one or more other types of processing to obtain a processing result, and a plurality of initial predicted positions of the tracking target in the target image are obtained based on the processing result.

In some optional embodiments, the plurality of features of the target image and the features of the plurality of reference images may be connected or spliced to obtain a plurality of connected features, and a plurality of initial predicted positions of the tracking target in the target image is obtained based on the plurality of connected features or spliced features.

Optionally, connecting (or splicing) the plurality of features of the target image and the features of the plurality of reference images may be one-to-one connection (or splicing) between the plurality of features of the target image and corresponding features in the features of the plurality of reference images respectively, that is, the plurality of features of the target image are connected (or spliced) in one-to-one correspondence with the features of the plurality of reference images to obtain a plurality of connected features or spliced features.

In an optional implementation, the connection (or splicing) herein refers to channel overlay. For example, a first image frame outputs three feature maps via three channels, a reference image outputs three feature maps via three channels, and six feature maps may be obtained by means of feature connection.

In the embodiments of the present disclosure, a plurality of modes for obtaining the position of the tracking target based on the connected features is provided. In some optional embodiments, the initial predicted positions of the tracking target may be obtained via the processing of a fully connected layer and/or other network layers, which is not limited in the embodiments of the present disclosure.

In the embodiments of the present disclosure, feature extraction is performed on the target image by various modes, for example, feature extraction is performed by Region of Interest (ROI) pooling, or feature extraction is performed by ROI alignment, or feature extraction is performed by other means, to obtain the plurality of features of the target image, which is not limited in the embodiments of the present disclosure.

ROI pooling, as its name implies, is one of a pooling layer, and is pooling targeted to ROIs. The characteristic of ROI pooling is that a size of the input feature map is not fixed, but the size of the output feature map is fixed. If the size of the ROI is (7, 6), and the size after ROI pooling is (6, 6), the conversion from (7, 6) to (6, 6) inevitably brings about loss of a certain pixel at the edge. ROI alignment involves interpolating and extending an ROI of (7, 6) to (12, 12) by means of bilinear interpolation, and the ROI pooling to (6, 6) is then performed, in this case, the precision can be improved.

In addition, in the embodiments of the present disclosure, feature extraction may be optionally performed on the target image based on the position of the tracking target in at least one reference image of the plurality of reference images to obtain a feature of the target image, where the at least one reference image may be some or all of the plurality of reference images. For example, feature extraction is performed on the target image based on the positions of the tracking target in the K reference images to obtain K features of the target image, where K is an integer greater than or equal to 1. However, the embodiments of the present disclosure are not limited thereto.

In some optional embodiments, the performing feature extraction on the target image to obtain a plurality of features of the target image includes the following operations:

a convolution operation is performed on the target image to obtain an intermediate feature; and a plurality of Region of Interest (ROI) alignment operations is performed on the intermediate feature to obtain the plurality of features of the target image.

Optionally, the intermediate feature may be a feature map or in other forms. Assuming that the intermediate feature is a feature map, an ROI alignment operation may be optionally performed by selecting an ROI in the feature map to obtain a feature of the target image. In this way, by selecting a plurality of ROIs, a plurality of features of the target image may be obtained.

In the embodiments of the present disclosure, an ROI may be selected from the feature map by various modes. Optionally, an ROI alignment operation may be performed on the intermediate feature by using the position of the tracking target in at least one of the plurality of reference images as an ROI, so as to obtain a feature of the target image. In some embodiments, an ROI may be determined based on the position of the tracking target in a reference image. For example, the position of a bounding box, of the tracking target in a reference image, in the reference image is used as an ROI, or an ROI is obtained by performing one or more operations, such as translation and enlargement, on a bounding box corresponding to the tracking target in a reference image, which is not limited in the embodiments of the present disclosure.

In some embodiments, the ROI alignment operation is performed by using the position of a bounding box, corresponding to the tracking target in the at least one of the plurality of reference images, in the reference image as an ROI, so as to obtain the feature of the target image. The bounding box corresponding to the tracking target may be the bounding box per se of the tracking target, or may be obtained by processing the bounding box of the tracking target. For example, by enlarging the bounding box of the tracking target in the reference image by a first preset multiple, a bounding box corresponding to the tracking target in the reference image is obtained.

Optionally, the first preset multiple may be determined according to an application scenario or an actual requirement, for example, the first preset multiple is equal to 2.0, but the value of the first preset multiple is not limited in the embodiments of the present disclosure.

After determining the position of the bounding box, corresponding to the tracking target in the reference image, in the reference image, a region at this position in the target image may be used as an ROI.

Since the tracking target may have a displacement from the reference image to the target image, if the feature of the target image is still obtained by the bounding box in the reference image, the accurate position of the tracking target may be missed. Therefore, the bounding box of the tracking target in the reference image is enlarged by a first preset multiple, and the position of the enlarged bounding box in the reference image is used as an ROI for an ROI alignment operation, which can improve the prediction accuracy.

In the embodiments of the present disclosure, feature extraction may be performed directly on the target image, for example, a convolution operation is performed on the target image, or feature extraction is performed after performing one or more types of pre-processing on the target image, where the pre-processing includes one or more of cropping, resizing, scaling, rotating, and brightness adjustment, which is not limited in the embodiments of the present disclosure.

In some optional embodiments, before the performing a convolution operation on the target image to obtain an intermediate feature, the method further includes the following operation: cropping processing is performed on the target image to obtain a cropped image. Correspondingly, a convolution operation is performed on the cropped image to obtain the intermediate feature.

Optionally, cropping processing may be performed on the target image based on a preset size, or cropping processing may be performed on the target image based on other images in the video stream. For example, cropping processing may be performed on the target image based on position information of the tracking target in at least one first image to obtain the cropped image, where the at least one first image is before the target image. Optionally, the at least one first image may include at least one image that is adjacent to the target image; or the at least one first image includes at least one reference image of the target image, which is not limited in the embodiments of the present disclosure.

In some embodiments, the proportion of the tracking target in the cropped image reaches a certain value, which is not limited in the embodiments of the present disclosure.

Optionally, a convolution operation may be performed on the cropped image through a convolutional layer in a neural network to obtain an intermediate feature, which is not limited in the embodiments of the present disclosure.

Optionally, in some embodiments, the performing cropping processing on the target image based on position information of the tracking target in at least one first image to obtain the cropped image includes the following operations:

a center point of the cropped image is determined based on the position information of the tracking target in the at least one first image; and cropping processing is performed on the target image based on the center point of the cropped image to obtain the cropped image.

The target image is cropped in order to separate the tracking target from the target image, so that the proportion of the tracking target in the obtained cropped image is greater than a certain proportion, thereby facilitating more accurate determination of the position of the tracking target.

Optionally, the position of the center point of the cropped image may be determined based on the position of the center point of a bounding box corresponding to the tracking target in the at least one first image. For example, the number of the at least one first image is plural, and correspondingly, the average value of the positions of the center points of bounding boxes corresponding to the tracking target in the plurality of first images is taken as the position of the center point of the cropped image. For another example, the number of the at least one first image is one, and correspondingly, the position of the center point of a bounding box corresponding to the tracking target in the first image is used as the position of the center point of the cropped image, or one or more types of processing, such as translation, is performed on the position of the center point of the bounding box corresponding to the tracking target in the first image to obtain the position of the center point of the cropped image. However, the embodiments of the present disclosure are not limited thereto.

Optionally, the cropping process may include two parts, i.e., determining the center point and determining the length and width of the cropped image. In an optional example, the center point is determined based on a reference image that is closer to the target image (e.g., closest to the target image) or on the position center of the tracking target in the previous image frame of the target image, and the length and width of the cropped image are determined based on a bounding box corresponding to the tracking target in the reference image or the previous image frame. In another optional example, the center point of a bounding box corresponding to the tracking target in the at least one first image may be averaged to obtain the center point of the cropped image. However, the embodiments of the present disclosure are not limited thereto.

In some embodiments, before cropping, the target image may also be enlarged by a second preset multiple to obtain an enlarged target image. Correspondingly, cropping processing is performed on the enlarged target image based on the center point of the cropped image to obtain the cropped image.

The first preset multiple and the second preset multiple may be equal or not be equal. The second preset multiple may be determined according to an actual application scenario or requirement. For example, the second preset multiple is equal to 3.0. However, the embodiments of the present disclosure are not limited thereto.

At operation 130, a final position of the tracking target in the target image is determined based on the plurality of initial predicted positions.

In an optional example, the operation 130 may be performed by a processor by invoking a corresponding instruction stored in a memory, or may be performed by a final position unit 43.

Optionally, the initial predicted position and/or the final position may refer to the position of a bounding box corresponding to the tracking target, such as, for example, the position of a face box, a box of a human body, of a particular object or of a particular part. The specific form of the position of the tracking target is not limited in the embodiments of the present disclosure.

In some embodiments, the plurality of initial predicted positions may be subjected to averaging, such as, for example, mathematical averaging or weighted averaging, to obtain the final position of the tracking target in the target image. In some other embodiments, at least one initial predicted position may be selected from the plurality of initial predicted positions, and the final position of the tracking target in the target image is obtained based on the at least one initial predicted position.

In one or more optional embodiments, the final position of the tracking target in the target image is determined based on the confidence scores of the plurality of initial predicted positions.

Optionally, at least one initial predicted position is selected from the plurality of initial predicted positions based on the confidence scores of the plurality of initial predicted positions, and the final position is determined based on the at least one initial predicted position. For example, at least one initial predicted position having a higher confidence score is selected from the plurality of initial predicted positions. The at least one initial predicted position may be a preset number of positions having the highest confidence scores in the plurality of initial predicted positions, or may be a position having a confidence score greater than a second preset threshold in the plurality of initial predicted positions. This is not limited in the embodiments of the present disclosure.

The confidence score refers to the probability that the predicted position corresponds to the actual position of the tracking target in the target image. In some embodiments, the confidence score is obtained by means of a scoring network. The scoring network is a trained neural network. For example, by means of a binary classification network, if the predicted position coincides with the actual position, an actual value 1 and a predicted value 0 are output, and if the predicted position does not coincide with the actual position, an actual value 0 and a predicted value 1 are output, etc. The specific implementation of the scoring network is not limited in the embodiments of the present disclosure.

In some embodiments, the average value of the selected at least one initial predicted position is used as the final position, where the average value may be an arithmetic average value, a geometric average value, or a weighted average value. For example, the selected at least one initial predicted position is subjected to weighted averaging to obtain the final position of the tracking target in the target image. The weight of the initial predicted position is relevant to the confidence score thereof. The higher the confidence score, the greater the weight, and the lower the confidence score, the smaller the weight. However, the embodiments of the present disclosure are not limited thereto.

An initial predicted position involving a large deviation in the obtained initial predicted positions may be deleted according to the confidence score. Accordingly, the obtained final position is closer to the actual position of the tracking target in the target image, thereby tracking being implemented better.

Optionally, the determining a confidence score of at least one initial predicted position in the plurality of initial predicted positions includes the following operations:

the plurality of initial predicted positions are separately processed by a confidence scoring network to obtain confidence scores corresponding to the plurality of initial predicted positions.

The confidence scoring network is obtained through training. The trained confidence scoring network may output a confidence score corresponding to an input initial predicted position. Optionally, an error may be obtained based on a predicted confidence score and an actual confidence score, and the scoring network is trained by a reverse gradient propagation method according to the error, and the trained scoring network can better predict the probability of a predicted position being an actual position (a known target position). The scoring network is trained for a particular object required to be tracked. For example, if a face needs to be tracked, a face image is used to train the scoring network.

Optionally, before the separately processing the plurality of initial predicted positions by a confidence scoring network to obtain confidence scores corresponding to the plurality of initial predicted positions, the method further includes the following operations:

at least one initial predicted position of a sample image is processed by the confidence scoring network to obtain a predicted confidence score corresponding to the at least one initial predicted position;

an actual confidence score of the at least one initial predicted position is determined based on an annotated position of the sample image; and the confidence scoring network is trained based on the predicted confidence score and actual confidence score of the at least one initial predicted position.

In order to improve the accuracy of the confidence scoring network, the confidence scoring network needs to be trained. The training process is the same as the training process of a neural network, i.e., both related to training the confidence scoring network based on a sample image having a known actual confidence score. Optionally, targeted training may be used for different tracking targets. For example, if a face needs to be tracked, the confidence scoring network is trained by a face image having a known actual confidence score in the process of training the confidence scoring network, so that confidence scoring of a face image by the obtained confidence scoring network is more accurate.

According to the target tracking methods provided by the embodiments of the present disclosure, features of a plurality of reference images of a target image are obtained, a plurality of initial predicted positions of a tracking target in the target image are determined based on the features of the plurality of reference images, and a final position of the tracking target in the target image is determined based on the plurality of initial predicted positions. Therefore, the dependence of target tracking on reference images can be avoided, thereby improving the robustness of target tracking.

In one or more optional embodiments, the final position of the tracking target in the target image is determined based on the similarity between the plurality of initial predicted positions and an appearance reference position of the tracking target.

Optionally, at least one initial predicted position is selected from the plurality of initial predicted positions based on the similarity between the plurality of initial predicted positions and the appearance reference position of the tracking target. For example, at least one initial predicted position that has a large similarity to the appearance reference position of the tracking target is selected from the plurality of initial predicted positions. The at least one initial predicted position may be a position in the plurality of initial predicted positions that has a similarity to the appearance reference position greater than a first preset threshold, or a preset number of positions in the plurality of initial predicted positions that have a largest similarity to the appearance reference position. This is not limited in the embodiments of the present disclosure.

Optionally, the appearance reference position of the tracking target may be obtained from other apparatuses. Or a first buffer for storing the appearance reference position of the tracking target may be set, and the first buffer may also be referred to as an Appearance Exemplar Buffer (AEB) or other names. The name of the first buffer is not limited in the embodiments of the present disclosure. In this case, the appearance reference position of the tracking target may be obtained from the first buffer. Or the appearance reference position of the tracking target may be obtained by other modes. The mode for obtaining the appearance reference position of the tracking target is not limited in the embodiments of the present disclosure.

The appearance reference position may be preset, or may be the position of the tracking target in one or more image frames of the video stream, or may be obtained by performing processing according to the position of the tracking target in one or more image frames in the video stream. For example, the appearance reference position of the tracking target is obtained based on the final position of the tracking target in at least one image before the target image. In one example, the appearance reference position of the tracking target is the final position of the tracking target in a certain reference image before the target object, such as, for example, the final position of the tracking target in the reference image closest to the target image; or the appearance reference position of the tracking target is obtained by performing one or more types of processing, such as averaging or merging, on the final position of the tracking target in at least one reference image before the target object. Information buffered in the first buffer may be fixed, or may be updated according to image frames at fixed intervals or to other triggering conditions, which is not limited in the embodiments of the present disclosure. After the filtering based on similarity, a predicted position with higher correlation with the target image may be obtained, which can save the calculation time, improve the tracking speed, and ensure the tracking accuracy.

Optionally, the final position of the tracking target in the target image is determined based on the distance between an initial predicted position and the appearance reference position.

Optionally, the similarity between at least one initial predicted position and the appearance reference position of the tracking target may be determined based on the intersection-over-union between a bounding box corresponding to the initial predicted position and a bounding box corresponding to the appearance reference position of the tracking target.

The intersection-over-union means the ratio of the intersection to the union of two regions. In the embodiments of the present disclosure, the intersection-over-union may refer to the ratio of the intersection, between a bounding box corresponding to an initial predicted position and a bounding box corresponding to the appearance reference position, to the union of the bounding box corresponding to the initial predicted position and the bounding box corresponding to the appearance reference position. The greater the intersection-over-union, the more similar the two bounding boxes, that is, the greater the similarity; the smaller the intersection-over-union, the smaller the similarity between the two bounding boxes.

Optionally, in the embodiments of the present disclosure, the similarity between an initial predicted position and the appearance reference position may also be determined by other modes, which is not limited in the embodiments of the present disclosure.

Optionally, weighted averaging may be performed on at least one initial predicted position having the similarity greater than a first preset threshold to obtain the final position corresponding to the target image.

Each initial predicted position corresponds to one weight. An initial predicted position having greater similarity corresponds to a greater weight; on the contrary, an initial predicted position having smaller similarity corresponds to a smaller weight.

Optionally, the at least one initial predicted position having the similarity greater than the first preset threshold may be directly averaged to obtain the position of the tracking target in the target image. In this case, the at least one initial predicted position corresponds to the same weight. Or the at least one initial predicted position may be processed by other modes to obtain the position of the tracking target in the target image. This is not limited in the embodiments of the present disclosure.

In some optional embodiments, the method further includes the following operation: the determined final position of the tracking target in the target image is stored into a first buffer, where the first buffer is used for storing the appearance reference position of the tracking target.

Optionally, in the embodiments of the present disclosure, the location of the tracking target in the target image may be stored in the first buffer in an overwritten or incremental manner, which is not limited in the embodiments of the present disclosure. Optionally, the position of the tracking target in the target image may be stored under any condition; or the tracking target is stored in the first buffer if the position of the tracking target in the target image satisfies a certain preset condition, such as, for example, the interval between the target image and an image frame corresponding to the appearance reference position stored in the first buffer is a preset value; or the position of the tracking target in the target image satisfies a preset condition, such as, for example, the difference between the target image and the appearance reference position stored in the first buffer exceeds a certain threshold, or the like. The condition for storing the position of the tracking target in the target image is not limited in the embodiments of the present disclosure.

In one or more optional embodiments, after determining the final position of the tracking target in the target image, whether to add the target image to a reference image list may also be determined, that is, to determine whether to update the reference image list using the target image. The reference image list may include a plurality of reference images, and the reference image list may be used for tracking a tracking target in an image frame to be processed. If position prediction is always performed on a target image using the feature of a same reference image, if the tracking target moves a lot in position, the position may be inaccurate. Therefore, in order to improve the prediction accuracy, the reference image list may be updated periodically or irregularly, which is not limited in the embodiments of the present disclosure.

In the embodiments of the present disclosure, whether to add the target image to the reference image list may be optionally determined based on the final position of the tracking target in the target image and the positions of the tracking target in the plurality of reference images, or the reference image list may be updated at fixed image intervals (for example, an interval of M image frames). In this case, whether to add the target image to the reference image list may be determined according to whether the interval between the target image and the plurality of reference images satisfies a preset condition, or whether to add the target image to the reference image list is determined based on other criteria.

In actual target tracking, since the motion of a tracking target is complex, the speed thereof is not constant. For a $(t+1)^{-th}$ frame of target image, a stored reference image list may be dynamically adjusted by comparing the position of a tracking target in the $t^{-th}$ frame with the positions thereof in a plurality of reference images, to obtain the feature of a more appropriate reference image.

Optionally, if the reference image list is updated using the $t^{-th}$ frame, that is, the $t^{-th}$ frame is added to the reference image list, the $(t+1)^{-th}$ frame of target image and a reference image closest to the target image among a plurality of reference images may be adjacent to each other; if the $t^{-th}$ frame is not added to the reference image list, the reference image list is not updated, and in this case, the $(t+1)^{-th}$ frame of target image may be spaced from a reference image closest to the target image among a plurality of reference images by one or more images. For example, the target image may be spaced from a reference image, that is closest to the target image among the plurality of reference images, by N image frames, where N is a preset value greater than or equal to 2. The value of N may be determined according to an application scenario, and is not limited in the embodiments of the present disclosure.

Optionally, the determining whether to add the target image to a reference image list based on the final position of the tracking target in the target image and the positions of the tracking target in the plurality of reference images includes the following operation:

whether to add the target image to the reference image list is determined based on the intersection-over-union between a bounding box of the tracking target in the target image and bounding boxes of the tracking target in the plurality of reference images.

Optionally, the intersection-over-union between the bounding box of the tracking target in the target image and each of the bounding boxes of the tracking target in the plurality of reference images is determined; average intersection-over-union is obtained based on the determined plurality of intersection-over-unions; and the target image is added to the reference image list in response to the average intersection-over-union being greater than or equal to an intersection-over-union threshold.

Optionally, obtaining the average intersection-over-union based on the plurality of intersection-over-union is implemented by averaging the plurality of intersection-over-union, or by weighted averaging of the plurality of intersection-over-union. Optionally, a reference image closer to the target image has the intersection-over-union corresponding to a greater weight.

In some optional embodiments, if the final position is close to the position in a reference image that is closest to the target image among the plurality of reference images, e.g., the intersection-over-union between two bounding boxes is greater than or equal to a set threshold, the target image does not need to be added to the reference image list, and information of the current reference image list may be continuously used for guiding position prediction of the next image frame. If the final position is distant from the position in the reference image that is closest to the target image among the plurality of reference images, e.g., the intersection-over-union between two bounding boxes is smaller than the set threshold, the target image may be added to the reference image list. Through such a dynamic adjustment mechanism, previously calculated features (such as the intermediate feature map) may be fully utilized, thereby reducing many unnecessary feature extraction processes.

For example, if the target tracking method is used for tracking one object having the absolute position substantively stay unchanged in a video clip, the reference image may not be updated, and a same reference image is always used, thereby greatly improving the positioning speed of the tracking target in at least one video image frame, and improving the tracking efficiency.

In one or more optional embodiments, if the target image is spaced from a reference image, that is closer (such as, for example, closest) to the target image among the plurality of reference images, by a preset number of image frames, the target image is determined to be added to the reference image list.

For a particular issue (tracking a particular target, and for example, face tracking), a targeted reference image update strategy may be used to adjust the reference image in the target tracking method in application, which has a strong promotion value.

In one or more optional embodiments, the features of the target image are buffered in a second buffer in response to determining to add the target image to the reference image list.

Optionally, the quantity of data stored in the second buffer may be continuously increased, and accordingly, the number of reference images included in a reference image list may be continuously increased. In this way, if it is required to perform position prediction, features of a fixed number of latest reference images among all currently stored reference images can be called from the second buffer. Optionally, in order to save storage space, a preset number of reference images may be stored in the second buffer, and when a new reference image is added to the reference image list, one or more reference images stored earlier (e.g., earliest) may be deleted, and correspondingly, the number of reference images included in the reference image list may remain fixed. When position prediction is required, it only needs to call features of all currently stored reference images from the buffer.

Figure 2:
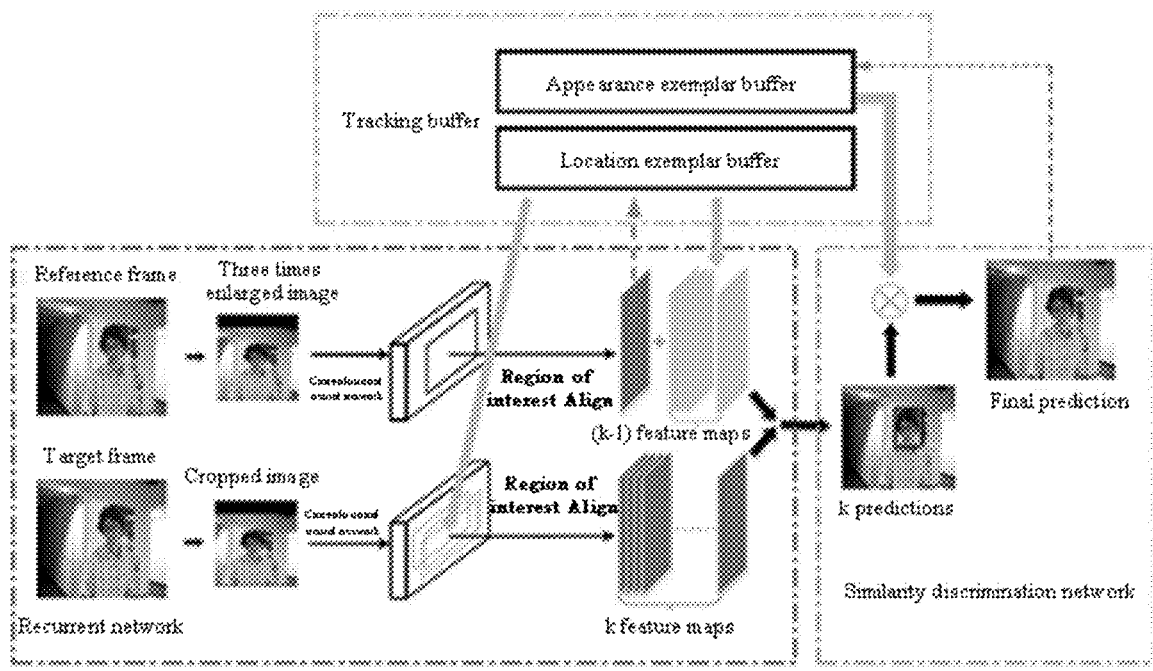
FIG. 2 is a flowchart of an optional example of a target tracking method provided by the embodiments of the present disclosure.

FIG. 2 is a flowchart of an optional example of the target tracking method provided by the embodiments of the present disclosure. As shown in FIG. 2, a tracking buffer may be provided, which includes two parts: an AEB (the first buffer) and a location exemplar buffer (the second buffer). The AEB is configured to buffer reference position information of a tracking target for determining the similarity between the positions of the tracking target. The location exemplar buffer is configured to buffer a feature map of at least one of k reference images and the position of a tracking target in at least one of the k reference images, that are used for performing multi-frame fusion.

On the other hand, the entire target tracking network may include a recurrent network and a similarity discrimination network, where the recurrent network is used for feature extraction, and the similarity discrimination network may be used for similarity comparison.

The recurrent network may include two branches: a reference image branch and a target frame branch. In the reference image branch, a reference image may be enlarged by 3 times (e.g., padding) to obtain an enlarged image, and the enlarged image is input to a Convolutional Neural Network (CNN) to obtain an intermediate feature. Then, the intermediate feature may be subjected to ROI alignment or ROI pooling to obtain a feature map corresponding to the reference image, and the position of the tracking target in the reference image may be obtained based on the feature map. In addition, the feature map corresponding to the reference image and the position of the tracking target may further be stored in the location exemplar buffer.

In the target frame branch, a target frame may be cropped to obtain a cropped image, and the cropped image is input to a CNN for processing to obtain an intermediate feature; then, based on the positions of the tracking target in the k reference images buffered in the location exemplar buffer, ROI alignment operations are performed on the intermediate feature to obtain k feature images of the target image; next, the k feature maps of the target image and the feature maps of the k reference images buffered in the location exemplar buffer are spliced to obtain k proposals, which may also be referred to as k initial predicted positions; and finally, the similarity discrimination network may be used to compare the similarity between each of the k proposal boxes and the appearance reference position buffered in the AEB, to obtain a final prediction result of the target frame.

Figure 3:
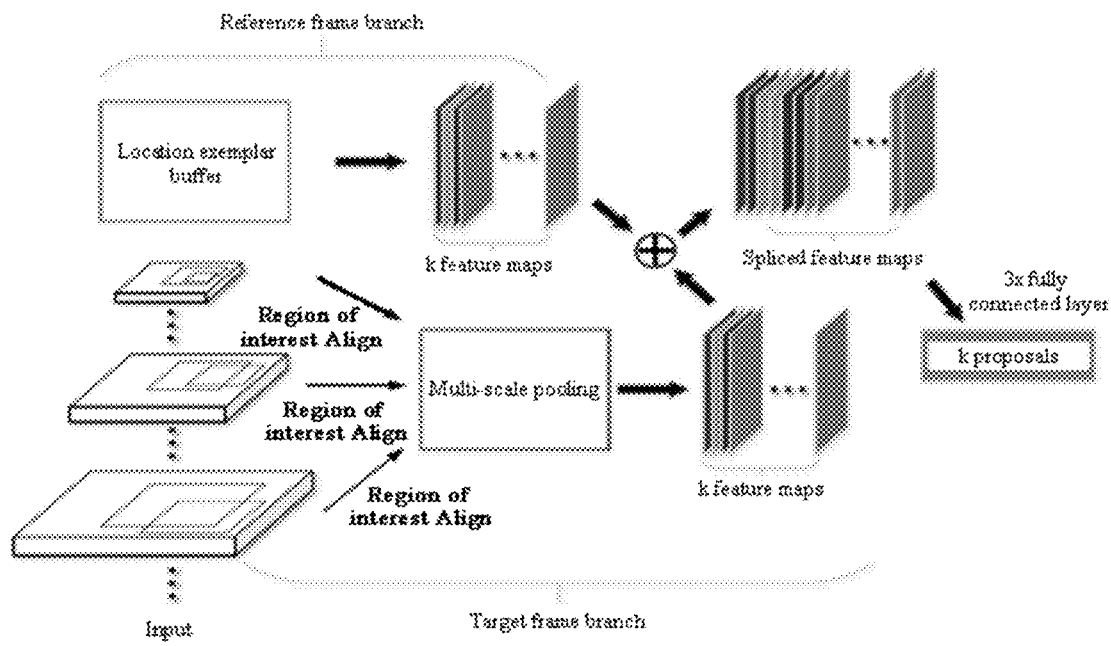
FIG. 3 shows a flowchart of an optional example of a target frame branch in the recurrent network shown in FIG. 2 to obtain k proposals of the target frame.

FIG. 3 shows a flowchart of an optional example of the target frame branch in the recurrent network shown in FIG. 2 to obtain k proposals of the target frame. As shown in FIG. 3, a location exemplar buffer associated with a reference frame branch stores k bounding boxes, ROI alignment may be performed based on the k bounding boxes to obtain a plurality of feature maps with different scales, and weighted summation is performed by multi-scale pooling to obtain k feature maps; then, the k feature maps may be spliced with the k feature maps stored in the location exemplar buffer to obtain a spliced feature map, and the spliced feature map is then subjected to processing of one or more (exemplarily shown three in the drawing) fully connected layers to obtain k proposals.

It should be understood that the examples shown in FIG. 2 and FIG. 3 are merely for the purpose of facilitating better understanding of the technical solutions provided by the embodiments of the present disclosure, and are not to be construed as limiting the embodiments of the present disclosure. Various modifications and replacements may be performed on the embodiments of the present disclosure based on the examples shown in FIG. 2 and FIG. 3, and some of actions or processes may be omitted, which is not limited in the embodiments of the present disclosure.

The present disclosure proposes a recurrent network framework based on multi-frame information for various application scenarios of target tracking technologies. The target tracking methods provided by the present disclosure mainly improves the speed and robustness of target tracking.

On one hand, the target tracking framework in the present disclosure is based on a feature reuse technology of a deep recurrent network, and utilizes a more efficient intermediate feature map management concept, thereby enhancing feature reuse of the whole system in feedforward of the deep recurrent network, and ensuring the high efficiency of the tracking method. On the other hand, the present disclosure proposes an ROI-based feature map and a multi-frame reuse and information fusion strategy, thus solving the problem of the dependence of a conventional regression algorithm on the reference image, and making the tracking system more robust during test. In summary, the present disclosure improves the robustness of the target tracking method while maintaining high speed.

When a user uses a cell phone or a camera to detect a face and a common object, the common concept is to improve the speed and reduce the power consumption of a device by combining with a target tracking algorithm. In the embodiments of the present disclosure, a feature buffering mechanism and a feature reuse mechanism are used on a deep recurrent network-based target tracking technology, and thus, the speed of target tracking can be greatly improved, and high-rate tracking of 1500 fps can be implemented on a particular task (face tracking); moreover, tracking based on features of a plurality of reference images can improve the tracking accuracy. This is critical in actual product applications, and significantly improves the forward speed of a conventional algorithm.

According to one or more of embodiments of the present disclosure, a practical high-speed target tracking algorithm having high robustness is proposed, and the algorithm of the present disclosure is proposed on the basis of a deep recurrent network-based feature reuse technology. A conventional deep recurrent network mainly consists of a reference image branch and a target frame branch, and implements position prediction of a target object by modeling the displacement of the target object between two frames. The present disclosure proposes to use a location exemplar buffer to store calculated intermediate features (features of reference images), and to reuse features of previously buffered reference images in subsequent prediction, so that the position of a tracking target can be quickly predicted by using the features of a plurality of reference images. In the target image branch, the present disclosure proposes to use ROI alignment to achieve feature sharing; the feature buffering mechanism and the feature sharing mechanism make quick multi-frame fusion prediction possible, and enabling quick and robust target tracking.

The technical solutions in the embodiments of the present disclosure have strong expansibility, and the system may be combined with multiple multi-frame fusion strategies. For example, a similarity measurement method, or fusion of results of multiple frames by the shown scoring method on a specific task can achieve a better result.

In other target tracking algorithms involving a target tracking algorithm in which the previous frame is used as a reference image to predict the position in the current frame, when a pillar covers a pedestrian during pedestrian tracking, the coverage in the reference image may causes a location exemplar calculated according to the reference image to drift, and prediction cannot be given accurately. The target tracking method provided by the embodiments of the present disclosure can effectively solve the problem by a plurality of reference image frames.

According to one or more of embodiments of the present disclosure, a feature buffer-based architecture is provided and a practical high-precision and high-speed target tracking method is implemented. According to the present disclosure, a mechanism of maintaining and reusing an intermediate feature map of a recurrent network by means of feature buffering is provided by analyzing the structure of the recurrent network. A conventional deep recurrent network mainly consists of a reference image branch and a target frame branch, and implements position prediction of a target object by modeling the displacement of the target object between two frames. The present disclosure propose that the intermediate feature obtained through calculation is stored by means of a location exemplar buffer (a location exemplar obtained by a reference image branch through calculation), and the previously buffered location exemplar is reused in subsequent prediction, thereby quickly predicting an object by using a plurality of reference image exemplars. The method provided in the present disclosure may be applied to various target tracking scenarios, increases the running speed of a deep recurrent network-based target tracking algorithm to nearly twice the original speed, improves the real-time performance of tracking, and reduces the power consumption of a device.

Persons of ordinary skill in the art may understand that: all or some operations for implementing the foregoing method embodiments may be implemented by a program by instructing related hardware; the foregoing program may be stored in a computer-readable storage medium; and when the program is executed, the operations including the foregoing method embodiments are executed. Moreover, the foregoing storage medium includes various media capable of storing a program code, such as a Read-Only Memory (ROM), a Random Access Memory (RAM), a magnetic disk, or an optical disk.

Figure 4:
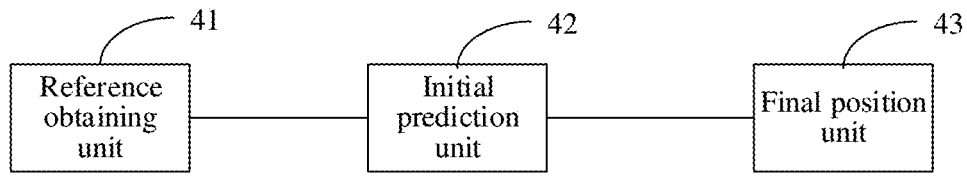
FIG. 4 is a schematic structural diagram of a target tracking apparatus provided by the embodiments of the present disclosure.

FIG. 4 is a schematic structural diagram of a target tracking apparatus provided by the embodiments of the present disclosure. The apparatus of this embodiment may be configured to implement the foregoing method embodiments of the present disclosure. As shown in FIG. 4, the apparatus of this embodiment includes the following components.

A reference obtaining unit 41 is configured to obtain features of a plurality of reference images of a target image.

In order to track a tracking target, a plurality of image frames of the tracking target is optionally acquired by means of video recording or the like, and by determining the positions of the tracking target in these images in combination with the time of obtaining the images, the trajectory of the tracking target by time is determined, thereby implementing tracking of the tracking target.

In some embodiments, in order to track a tracking target, the position of the tracking target in one or more known images is required, and the tracking target currently required to be tracked is determined based on the position; or, the known tracking target is a certain particular target (for example, a face or human body), and a plurality of image frames are acquired for the known tracking target.

Optionally, the tracking target is tracked based on the determined position of the tracking target in one or more images. The tracking target in the embodiments of the present disclosure may be a known or unknown particular object, a human being or an object of other types, which is not limited in the embodiments of the present disclosure.

In the embodiments of the present disclosure, a reference image list including a plurality of reference images is employed. Any two of the plurality of reference images may be adjacent or not be adjacent to each other. For example, the plurality of reference images are K adjacent image frames in a video stream; or some adjacent reference images in the plurality of reference images are adjacent to each other in the video stream, and the other adjacent reference images are not adjacent to each other in the video; or any two adjacent reference images in the plurality of reference images are not adjacent to each other in the video stream. Optionally, the plurality of reference images are spaced by one or more images. For example, adjacent reference images in the plurality of reference images are spaced by a fixed number of image frames, such as N image frames, where N is a preset value greater than or equal to 2, the value of N may be determined according to application scenarios and requirements, and is not limited in the embodiments of the present disclosure; or, different adjacent images in the plurality of reference images are also spaced by different numbers of images, which is not limited in the embodiments of the present disclosure.

Optionally, the target image and the plurality of reference images are spaced by at least one image frame (referred to as a second image); or, the plurality of reference images includes at least two adjacent image frames; or, any two of the plurality of reference images are not adjacent. Optionally, the target image is spaced from any reference image in the plurality of reference images thereof by one or more images; or, the target image is adjacent to some reference images in the plurality of reference images, and is spaced from the other reference images in the plurality of reference images by one or more images, which is not limited in the embodiments of the present disclosure. Compared to the manner of using the previous image frame of the target image as a reference image, the technical solution provided in the embodiments of the present disclosure can improve the prediction precision, which is resulted from the fact that the prediction based on an earlier image is more accurate, and the problem of error accumulation may be efficiently solved by using an earlier image as a reference image for tracking.

In one or more optional embodiments, features of a plurality of reference images stored by a memory of an electronic device may be obtained by the reference obtaining unit 41. For example, features of a plurality of reference images of a target image are obtained from a second buffer. Optionally, the features of the reference images may be stored in the second buffer, and obtained from the second buffer, where the second buffer may also be called a location exemplar buffer. However, the name of the second buffer is not limited in the embodiments of the present disclosure.

An initial prediction unit 42 is configured to determine a plurality of initial predicted positions of a tracking target in the target image based on the features of the plurality of reference images.

A final position unit 43 is configured to determine a final position of the tracking target in the target image based on the plurality of initial predicted positions.

According to the target tracking apparatuses provided by the embodiments of the present disclosure, features of a plurality of reference images of a target image are obtained, a plurality of initial predicted positions of a tracking target in the target image are determined based on the features of the plurality of reference images, and a final position of the tracking target in the target image is determined based on the plurality of initial predicted positions. Therefore, the dependence of target tracking on reference images can be avoided, thereby improving the robustness of target tracking.

In one or more optional embodiments, the initial prediction unit 42 includes:

a feature extraction module, configured to perform feature extraction on the target image to obtain a plurality of features of the target image; and a position prediction module, configured to obtain the plurality of initial predicted positions of the tracking target in the target image based on the plurality of features of the target image and the features of the plurality of reference images.

Optionally, in some optional embodiments, the position prediction module may be configured to connect or splice the plurality of features of the target image and the features of the plurality of reference images to obtain a plurality of connected features, and obtain a plurality of initial predicted positions of the tracking target in the target image based on the plurality of connected features.

Optionally, connecting (or splicing) the plurality of features of the target image and the features of the plurality of reference images may be one-to-one connection (or splicing) between the plurality of features of the target image and corresponding features in the features of the plurality of reference images respectively, that is, the plurality of features of the target image are connected (or spliced) in one-to-one correspondence with the features of the plurality of reference images to obtain a plurality of connected features or spliced features.

In some optional embodiments, the feature extraction module includes:

a convolution module, configured to perform a convolution operation on the target image to obtain an intermediate feature; and an alignment module, configured to perform a plurality of ROI alignment operations on the intermediate feature to obtain the plurality of features of the target image.

Optionally, the alignment module is configured to perform, based on the position of the tracking target in a reference image, an ROI alignment operation on the intermediate feature to obtain a feature of the target image.

In the embodiments of the present disclosure, an ROI may be selected in the feature map by various modes. Optionally, an ROI alignment operation may be performed on the intermediate feature based on the position of the tracking target in a reference image to obtain a feature of the target image. In some embodiments, the alignment module may be configured to perform an ROI alignment operation by using the position of a bounding box, corresponding to the tracking target in a reference image, in the reference image as an ROI to obtain a feature of the target image. For example, the position of a bounding box, corresponding to the tracking target in a reference image, in the reference image is used as an ROI, or an ROI is obtained by performing one or more operations, such as translation, on a bounding box corresponding to the tracking target in a reference image, which is not limited in the embodiments of the present disclosure.

Optionally, the alignment module is further configured to enlarge the bounding box of the tracking target in the reference image by a first preset multiple to obtain a bounding box corresponding to the tracking target in the reference image.

Optionally, the first preset multiple may be determined according to an application scenario or an actual requirement, for example, the first preset multiple is equal to 2.0, but the value of the first preset multiple is not limited in the embodiments of the present disclosure.

Since the tracking target may have a displacement from the reference image to the target image, if the feature of the target image is still obtained by the bounding box in the reference image, the accurate position of the tracking target may be missed. Therefore, the bounding box of the tracking target in the reference image is enlarged by a first preset multiple, and the position of the enlarged bounding box in the reference image is used as an ROI for an ROI alignment operation, which can improve the prediction accuracy.

In some optional embodiments, the feature extraction module further includes:

a cropping module, configured to perform cropping processing on the target image to obtain a cropped image; and the convolution module, configured to perform a convolution operation on the cropped image to obtain the intermediate feature.

Optionally, cropping processing may be performed on the target image based on a preset size, or cropping processing may be performed on the target image based on other images in the video stream. For example, the cropping module may be configured to perform cropping processing on the target image based on position information of the tracking target in at least one first image to obtain the cropped image, where the at least one first image is before the target image. Optionally, the at least one first image may include at least one image that is adjacent to the target image; or the at least one first image includes at least one reference image of the target image. This is not limited in the embodiments of the present disclosure.

Optionally, in some embodiments, the cropping module includes:

a center determination module, configured to determine a center point of the cropped image based on the position information of the tracking target in the at least one first image; and a cropping processing module, configured to perform cropping processing on the target image based on the center point of the cropped image to obtain the cropped image.

The target image is cropped in order to separate the tracking target from the target image, so that the proportion of the tracking target in the obtained cropped image is greater than a certain proportion, thereby facilitating more accurate determination of the position of the tracking target.

Optionally, the cropping process may include two parts, i.e., determining the center point and determining the length and width of the cropped image. In an optional example, the center point may be determined based on a reference image that is closer to the target image (e.g., closest to the target image) or the position center of the tracking target in the previous image frame of the target image, and the length and width of the cropped image may be determined based on a bounding box corresponding to the tracking target in the reference image or the previous image frame. In another optional example, the center point of a bounding box corresponding to the tracking target in the at least one first image may be averaged to obtain the center point of the cropped image. However, the embodiments of the present disclosure are not limited thereto.

In some embodiments, the cropping processing module may be further configured to enlarge the target image by a second preset multiple to obtain an enlarged target image. Correspondingly, cropping processing may be performed on the enlarged target image based on the center point of the cropped image to obtain the cropped image.

In one or more optional embodiments, the final position unit 43 includes:

a similarity determination module, configured to determine the similarity between at least one initial predicted position in the plurality of initial predicted positions and an appearance reference position of the tracking target, separately, and obtain at least one initial predicted position having the similarity greater than a first preset threshold; and a first position calculation module, configured to determine the final position corresponding to the target image based on the at least one initial predicted position having the similarity greater than the first preset threshold.

Optionally, the appearance reference position of the tracking target may be obtained from other apparatuses. Or a first buffer for storing the appearance reference position of the tracking target may be set, and the first buffer may also be referred to as an AEB or other names. The name of the first buffer is not limited in the embodiments of the present disclosure. In this case, the appearance reference position of the tracking target may be obtained from the first buffer. Or the appearance reference position of the tracking target may be obtained by other modes. The mode for obtaining the appearance reference position of the tracking target is not limited in the embodiments of the present disclosure.

After the filtering based on similarity, a predicted position with higher correlation with the target image may be obtained, which can save the calculation time, improve the tracking speed, and ensure the tracking accuracy.

Optionally, the first position calculation module is configured to perform weighted averaging on the at least one initial predicted position having the similarity greater than the first preset threshold to obtain the final position corresponding to the target image.

Each initial predicted position corresponds to one weight. An initial predicted position having greater similarity corresponds to a greater weight; on the contrary, an initial predicted position having smaller similarity corresponds to a smaller weight.

Optionally, the similarity determination module may be configured to determine the similarity between at least one initial predicted position and the appearance reference position of the tracking target based on the intersection-over-union between a bounding box corresponding to the initial predicted position and a bounding box corresponding to the appearance reference position of the tracking target.

In some optional embodiments, the final position unit 43 further includes:

a position storage module, configured to store the determined final position of the tracking target in the target image into a first buffer, where the first buffer is used for storing the appearance reference position of the tracking target.

Optionally, in the embodiments of the present disclosure, the location of the tracking target in the target image may be stored in the first buffer in an overwritten or incremental manner, which is not limited in the embodiments of the present disclosure. Optionally, the position of the tracking target in the target image may be stored under any conditions. Or the tracking target is stored in the first buffer when the position of the tracking target in the target image satisfies a certain preset condition, for example, the interval between the target image and an image frame corresponding to the appearance reference position stored in the first buffer is a preset value, or the position of the tracking target in the target image satisfies a preset condition, for example, the difference between the target image and the appearance reference position stored in the first buffer exceeds a certain threshold, and the like. The condition for storing the position of the tracking target in the target image is not limited in the embodiments of the present disclosure.

In one or more optional embodiments, the final position unit 43 includes:

a confidence score determination module, configured to determine a confidence score of at least one initial predicted position in the plurality of initial predicted positions; and a second position calculation module, configured to determine the final position of the tracking target in the target image based on at least one initial predicted position having a confidence score greater than a second preset threshold.

The confidence score refers to the probability that the predicted position corresponds to the actual position of the tracking target in the target image. The confidence score is obtained by means of a scoring network. The scoring network is a trained neural network. For example, by means of a binary classification network, if the predicted position coincides with the actual position, an actual value 1 and a predicted value 0 are output, and if the predicted position does not coincide with the actual position, an actual value 0 and a predicted value 1 are output. This embodiment is mainly targeted at tracking of some specific objects (such as a face and a human body).

Optionally, the confidence score determination module is configured to perform weighted averaging on the at least one initial predicted position having the confidence score greater than the second preset threshold to obtain the final position of the tracking target in the target image.

The weight is related to the confidence score. The greater the confidence score, the greater the weight, and the smaller the confidence score, the smaller the weight.

Optionally, the confidence score determination module is configured to separately process the at least one initial predicted position by a confidence scoring network to obtain a confidence score corresponding to the at least one initial predicted position.

The confidence scoring network is obtained through training. The trained confidence scoring network may output a confidence score corresponding to an input initial predicted position. Optionally, an error may be obtained based on a predicted confidence score and an actual confidence score, and the scoring network is trained by a reverse gradient propagation method according to the error, and the trained scoring network can better predict the probability of a predicted position being an actual position (a known target position). The scoring network is trained for a particular object required to be tracked. For example, if a face needs to be tracked, a face image is used to train the scoring network.

Optionally, the confidence score determination module is further configured to:

process at least one initial predicted position of a sample image by the confidence scoring network to obtain a predicted confidence score corresponding to the at least one initial predicted position;

determine an actual confidence score of the at least one initial predicted position based on an annotated position of the sample image; and train the confidence scoring network based on the predicted confidence score and actual confidence score of the at least one initial predicted position.

In order to improve the accuracy of the confidence scoring network, the confidence scoring network needs to be trained. The training process is the same as the training process of a neural network, i.e., both related to training the confidence scoring network based on a sample image having a known actual confidence score. Optionally, targeted training may be used for different tracking targets. For example, if a face needs to be tracked, the confidence scoring network is trained by a face image having a known actual confidence score in the process of training the confidence scoring network, so that confidence scoring of a face image by the obtained confidence scoring network is more accurate.

In one or more optional embodiments, the apparatus further includes:

a reference image determination unit, configured to determine whether to add the target image to a reference image list based on the final position of the tracking target in the target image and the positions of the tracking target in the plurality of reference images.

The reference image list may include a plurality of reference images, and the reference image list may be used for tracking a tracking target in an image frame to be processed. If position prediction is always performed on a target image using the feature of the same reference image, if the tracking target moves a lot in position, the position may be inaccurate. Therefore, in order to improve the prediction accuracy, the reference image list may be updated periodically or irregularly, which is not limited in the embodiments of the present disclosure.

Optionally, the reference image determination unit may be configured to determine whether to add the target image to the reference image list based on a plurality of intersection-over-union between a bounding box of the tracking target in the target image and bounding boxes of the tracking target in the plurality of reference images.

Optionally, the reference image determination unit includes:

an intersection-over-union determination module, configured to: determine the intersection-over-union between the bounding box of the tracking target in the target image and each of the bounding boxes of the tracking target in the plurality of reference images; and obtain an average intersection-over-union based on the determined plurality of intersection-over-union; and an addition determination module, configured to add the target image to the reference image list in response to the average intersection-over-union being greater than or equal to an intersection-over-union threshold.

In one or more optional embodiments, the apparatus further includes:

a reference list update unit, configured to add the target image to the reference image list if the target image is spaced from a reference image, that is closer (e.g., closest) to the target image among the plurality of reference images, by a preset number of image frames.

For a particular issue (tracking a particular target, for example, face tracking), a targeted reference image update strategy may be used to adjust the reference image in the target tracking method in application, which has a strong promotion value.

In one or more optional embodiments, the apparatus further includes: a feature buffer unit, configured to buffer the features of the target image in a second buffer in response to determining to add the target image to the reference image list.

Optionally, the quantity of data stored in the second buffer may be continuously increased, and accordingly, the number of reference images included in a reference image list may be continuously increased. In this way, when position prediction is required, features of a fixed number of latest reference images among all currently stored reference images can be called from the second buffer. Optionally, in order to save storage space, a preset number of reference images may be stored in the second buffer, and when a new reference image is added to the reference image list, one or more reference images stored earlier (e.g., earliest) may be deleted. Correspondingly, the number of reference images included in the reference image list may remain fixed. When position prediction is required, it only needs to call features of all currently stored reference images from the buffer.

According to another aspect of the embodiments of the present disclosure, an electronic device is provided, including a processor, where the processor includes the target tracking apparatus according to any one of the foregoing embodiments of the present disclosure.

According to another aspect of the embodiments of the present disclosure, an electronic device is provided, including: a memory configured to store executable instructions; and a processor, configured to communicate with the memory to execute the executable instructions to implement any one of the foregoing embodiments of the target tracking methods provided in the present disclosure.

According to another aspect of the embodiments of the present disclosure, a computer storage medium is provided, configured to store computer-readable instructions, where when the instructions are executed by a processor, the processor implements any one of the foregoing embodiments of the target tracking methods provided in the present disclosure.

According to another aspect of the embodiments of the present disclosure, a computer program is provided, including a computer-readable code, where when the computer-readable code runs in a device, a processor in the device implements the target tracking method provided in the present disclosure.

According to yet another aspect of the embodiments of the present disclosure, a computer program product is provided for storing computer-readable instructions, where when the instructions are executed, the computer implements the target tracking method according to any one of the foregoing possible implementations.

In one or more optional embodiments, the embodiments of the present disclosure further provide a computer program product, configured to store computer-readable instructions, where when the instructions are executed, a computer implements the target tracking method in any one of the foregoing embodiments.

The computer program product is specifically implemented by means of hardware, software, or a combination thereof. In an optional example, the computer program product is specifically embodied as a computer storage medium. In another optional example, the computer program product is specifically embodied as a software product, such as Software Development Kit (SDK).

The embodiments of the present disclosure further provide another target tracking method and a corresponding apparatus, an electronic device, a computer storage medium, a computer program, and a computer program product. The method includes: obtaining features of a plurality of reference images of a target image; determining a plurality of initial predicted positions of a tracking target in the target image based on the features of the plurality of reference images; and determining a final position of the tracking target in the target image based on the plurality of initial predicted positions.

In some embodiments, the target tracking indication is specifically an invoking instruction. A first apparatus instructs, by means of invoking, a second apparatus to execute target tracking, and accordingly, in response to receiving the invoking instruction, the second apparatus executes the operations and/process in any one of the embodiments of the foregoing target tracking methods.

It should be understood that the terms such as "first" and "second" in the embodiments of the present disclosure are only used for distinguishing, and shall not be understood as limitations on the embodiments of the present disclosure.

It should also be understood that, in the present disclosure, "plurality of" may refer to two or more, and "at least one" may refer to one, two or more.

It should also be understood that, for any component, data or structure mentioned in the present disclosure, if there is no explicit limitation or no opposite motivation is provided in the context, it is generally understood that the number of the component, data or structure is one or more.

It should be further understood that the description of the embodiments of the present disclosure emphasizes the differences between the embodiments, and the same or similar points therebetween may be used as reference and are omitted for clarity.

Figure 5:
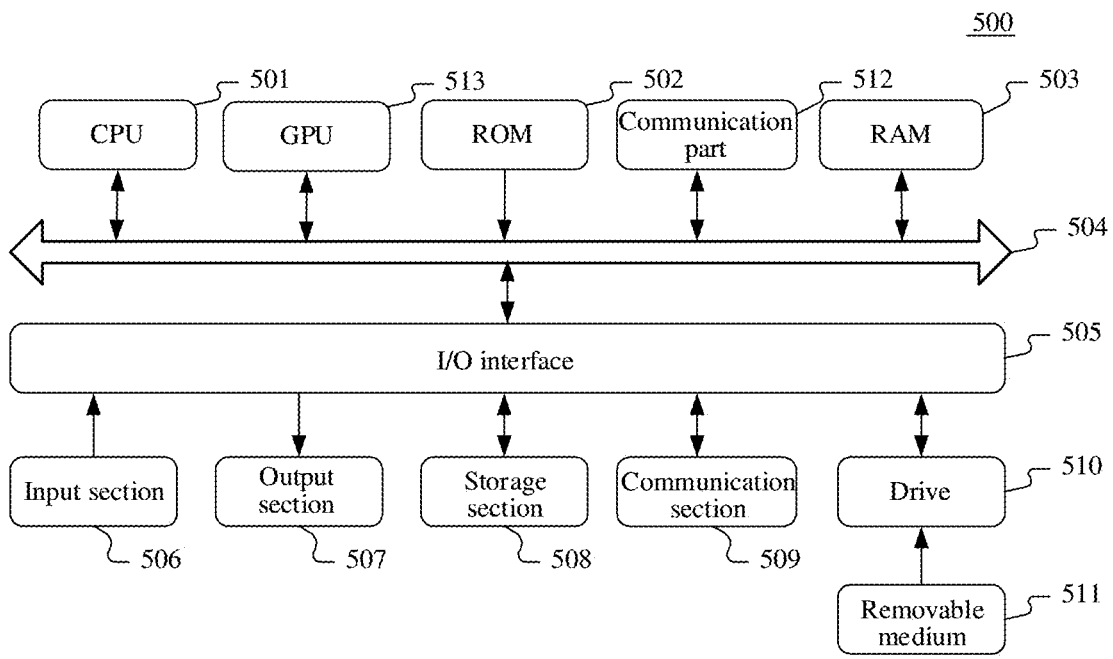
FIG. 5 is a schematic structural diagram of an electronic device, which may be a terminal device or a server, suitable for implementing the embodiments of the present disclosure.

The embodiments of the present disclosure further provide an electronic device which, for example, is a mobile terminal, a PC, a tablet computer, a server, and the like. Referring to FIG. 5 below, a schematic structural diagram of an electronic device 500, which may be a terminal device or a server, suitable for implementing the embodiments of the present disclosure is shown. As shown in FIG. 5, the computer system 500 includes one or more processors, a communication part, and the like. The one or more processors are, for example, one or more Central Processing Units (CPUs) 501 and/or one or more Graphic Processing Units (GPUs) 513, and the processor may execute appropriate actions and processing according to executable instructions stored in a ROM 502 or executable instructions loaded from a storage section 508 to a RAM 503. The communication part 512 may include, but is not limited to, a network card. The network card may include, but is not limited to, an Infiniband (IB) network card.

The processor may communicate with the ROM 502 and/or the RAM 503 to execute executable instructions, is connected to the communication part 512 by means of a bus 504, and communicates with other target devices by means of the communication part 512, so as to implement the operations corresponding to any of the methods provided in the embodiments of the present disclosure, for example, obtaining features of a plurality of reference images of a target image; determining a plurality of initial predicted positions of a tracking target in the target image based on the features of the plurality of reference images; and determining a final position of the tracking target in the target image based on the plurality of initial predicted positions.

In addition, the RAM 503 may further store various programs and data required for operations of the apparatus. The CPU 501, the ROM 502, and the RAM 503 are connected to each other via the bus 504. In the presence of the RAM 503, the ROM 502 is an optional module. The RAM 503 stores executable instructions, or writes the executable instructions into the ROM 502 during running, where the executable instructions cause the processor 501 to execute corresponding operations of the foregoing communication method. An Input/Output (I/O) interface 505 is also connected to the bus 504. The communication part 512 is integrated, or is configured to have multiple sub-modules (for example, multiple IB network cards) connected to the bus.

The following components are connected to the I/O interface 505: an input section 506 including a keyboard, a mouse and the like; an output section 507 including a Cathode-Ray Tube (CRT), a Liquid Crystal Display (LCD), a speaker and the like; the storage section 508 including a hard disk drive and the like; and a communication section 509 of a network interface card including an LAN card, a modem and the like. The communication section 509 performs communication processing via a network such as the Internet. A drive 510 is also connected to the I/O interface 505 according to requirements. A removable medium 511 such as a magnetic disk, an optical disk, a magneto-optical disk, a semiconductor memory or the like is mounted on the drive 510 according to requirements, so that a computer program read from the removable medium is installed on the storage section 508 according to needs.

It should be noted that the architecture illustrated in FIG. 5 is merely an optional implementation mode. During specific practice, the number and types of the components in FIG. 5 may be selected, decreased, increased, or replaced according to actual requirements. Different functional components may be separated or integrated or the like. For example, the GPU and the CPU may be separated, or the GPU may be integrated on the CPU, and the communication part may be separated from or integrated on the CPU or the GPU or the like. These alternative implementations all fall within the scope of protection of this disclosure.

Particularly, a process described above with reference to a flowchart according to the embodiments of the present disclosure may be implemented as a computer software program. For example, the embodiments of the present disclosure include a computer program product, which includes a computer program tangibly contained on a machine-readable medium. The computer program includes a program code configured to execute the method shown in the flowchart. The program code may include corresponding instructions for correspondingly executing the operations of the method provided by the embodiments of the present disclosure, for example, obtaining features of a plurality of reference images of a target image; determining a plurality of initial predicted positions of a tracking target in the target image based on the features of the plurality of reference images; and determining a final position of the tracking target in the target image based on the plurality of initial predicted positions. In such embodiments, the computer program is downloaded and installed from the network through the communication section 509, and/or is installed from the removable medium 511. The computer program, when being executed by the CPU 501, executes the foregoing functions defined in the methods of the present disclosure.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and apparatuses of the present disclosure are implemented in many manners. For example, the methods and apparatuses of the present disclosure are implemented with software, hardware, firmware, or any combination of software, hardware, and firmware. Unless otherwise specially stated, the foregoing sequences of operations of the methods are merely for description, and are not intended to limit the operations of the methods of the present disclosure. In addition, in some embodiments, the present disclosure may also be implemented as programs recorded in a recording medium. The programs include machine-readable instructions for implementing the methods according to the present disclosure. Therefore, the present disclosure further covers the recording medium storing the programs for executing the methods according to the present disclosure.

The descriptions of the present disclosure are provided for the purpose of examples and description, and are not intended to be exhaustive or limit the present disclosure to the disclosed form. Many modifications and changes are obvious to persons skilled in the art. The embodiments are selected and described to better describe a principle and an actual application of the present disclosure, and to make a person of ordinary skill in the art understand the present disclosure, so as to design various embodiments with various modifications applicable to particular use.

What is claimed is:

1. A target tracking method, comprising:
obtaining features of a plurality of reference images of a target image;
determining a plurality of initial predicted positions of a tracking target in the target image based on the features of the plurality of reference images; and
determining a final position of the tracking target in the target image based on the plurality of initial predicted positions,
wherein the determining a final position of the tracking target in the target image based on the plurality of initial predicted positions comprises:
determining a similarity between each of the plurality of initial predicted positions and an appearance reference position of the tracking target respectively, and obtaining at least one initial predicted position having a similarity greater than a first preset threshold; and
determining the final position of the tracking target in the target image based on the at least one initial predicted position having the similarity greater than the first preset threshold,
wherein the determining a similarity between each of the plurality of initial predicted positions and an appearance reference position of the tracking target respectively comprises:
determining, based on an intersection-over-union between a bounding box corresponding to the plurality of initial predicted positions and a bounding box corresponding to the appearance reference position of the tracking target, the similarity between each of the plurality of initial predicted positions and the appearance reference position of the tracking target respectively.

2. The method according to claim 1, wherein the determining a plurality of initial predicted positions of a tracking target in the target image based on the features of the plurality of reference images comprises:
performing feature extraction on the target image to obtain a plurality of features of the target image; and
obtaining the plurality of initial predicted positions of the tracking target in the target image based on the plurality of features of the target image and the features of the plurality of reference images.

3. The method according to claim 2, wherein the obtaining the plurality of initial predicted positions of the tracking target in the target image based on the plurality of features of the target image and the features of the plurality of reference images comprises:

connecting the plurality of features of the target image and corresponding features in the features of the plurality of reference images, respectively, to obtain a plurality of connected features; and obtaining the plurality of initial predicted positions of the tracking target in the target image based on the plurality of connected features.

4. The method according to claim 2, wherein the performing feature extraction on the target image to obtain a plurality of features of the target image comprises:

performing a convolution operation on the target image to obtain an intermediate feature; and performing, based on a position of a tracking target in at least one reference image in the plurality of reference images, a plurality of region of interest alignment operations on the intermediate feature to obtain the plurality of features of the target image.

5. The method according to claim 4, wherein the performing, based on a position of a tracking target in at least one reference image in the plurality of reference images, a region of interest alignment operation on the intermediate feature to obtain a feature of the target image comprises:

performing the region of interest alignment operation by using a position of a bounding box, corresponding to the tracking target in each of the at least one reference image, in the reference image as a region of interest to obtain the feature of the target image.

6. The method according to claim 5, wherein before the performing the region of interest alignment operation by using a position of a bounding box, corresponding to the tracking target in each of the at least one reference image, in the reference image as a region of interest to obtain the feature of the target image, the method further comprises:

enlarging the bounding box of the tracking target in each of the at least one reference image by a first preset multiple to obtain the bounding box corresponding to the tracking target in the reference image.

7. The method according to claim 2, wherein before the performing feature extraction on the target image to obtain a plurality of features of the target image the method further comprises:

performing, based on position information of a tracking target in at least one first image, cropping processing on the target image to obtain a cropped image, wherein the at least one first image is before the target image; and the performing feature extraction on the target image to obtain a plurality of features of the target image comprises:

performing feature extraction on the cropped image to obtain the plurality of features of the target image.

8. The method according to claim 1, further comprising:
storing the final position of the tracking target in the target image into a first buffer, wherein the first buffer is used for storing the appearance reference position of the tracking target.

9. The method according to claim 1, wherein the determining the final position of the tracking target in the target image based on the at least one initial predicted position_ having the similarity greater than the first preset threshold comprises:

performing weighted averaging on the at least one initial predicted position having the similarity greater than the first preset threshold to obtain the final position of the tracking target in the target image.

10. The method according to claim 1, wherein the obtaining features of a plurality of reference images of a target image comprises:

obtaining the features of the plurality of reference images of the target image from a second buffer.

11. The method according to claim 1, wherein the target image and the plurality of reference images are spaced by at least one second image; or the plurality of reference images comprise at least two adjacent image frames; or any two of the plurality of reference images are not adjacent.

12. The method according to claim 1, after the determining a final position of the tracking target in the target image based on the plurality of initial predicted positions, the method further comprises:

determining whether to add the target image to a reference image list based on the final position of the tracking target in the target image and positions of the tracking target in the plurality of reference images.

13. The method according to claim 1, after the determining a final position of the tracking target in the target image based on the plurality of initial predicted positions, the method further comprises:

adding the target image to a reference image list in response to the target image being spaced from a reference image, that is closest to the target image among the plurality of reference images, by a preset number of image frames.

14. The method according to claim 12, further comprising:

buffering features of the target image in a second buffer in response to determining to add the target image to the reference image list.

15. An electronic device, comprising:
a memory configured to store executable instructions; and
a processor configured to communicate with the memory to execute the executable instructions, when the executable instructions are executed by the processor, the processor is configured to:

obtain features of a plurality of reference images of a target image;

determine a plurality of initial predicted positions of a tracking target in the target image based on the features of the plurality of reference images; and determine a final position of the tracking target in the target image based on the plurality of initial predicted positions, wherein the processor is further configured to:
determine a similarity between each of the plurality of initial predicted positions and an appearance reference position of the tracking target respectively, and obtain at least one initial predicted position having a similarity greater than a first preset threshold; and determine the final position of the tracking target in the target image based on the at least one initial predicted position having the similarity greater than the first preset threshold, wherein the processor is specifically configured to:
determine, based on an intersection-over-union between a bounding box corresponding to the plurality of initial predicted positions and a bounding box corresponding to the appearance reference position of the tracking target, the similarity between each of the plurality of initial predicted positions and the appearance reference position of the tracking target respectively.

16. A non-transitory computer storage medium, configured to store computer-readable instructions, wherein when the computer-readable instructions are executed by a processor, the processor implements the following operations:

obtaining features of a plurality of reference images of a target image;

determining a plurality of initial predicted positions of a tracking target in the target image based on the features of the plurality of reference images; and determining a final position of the tracking target in the target image based on the plurality of initial predicted positions, wherein the determining a final position of the tracking target in the target image based on the plurality of initial predicted positions comprises:

determining a similarity between each of the plurality of initial predicted positions and an appearance reference position of the tracking target respectively, and obtaining at least one initial predicted position having a similarity greater than a first preset threshold; and determining the final position of the tracking target in the target image based on the at least one initial predicted position having the similarity greater than the first preset threshold, wherein the determining a similarity between each of the plurality of initial predicted positions and an appearance reference position of the tracking target respectively comprises:

determining, based on an intersection-over-union between a bounding box corresponding to the plurality of initial predicted positions and a bounding box corresponding to the appearance reference position of the tracking target, the similarity between each of the plurality of initial predicted positions and the appearance reference position of the tracking target respectively.

* * * * *